United States Patent
Lin et al.

(10) Patent No.: US 7,193,689 B2
(45) Date of Patent: Mar. 20, 2007

(54) METHOD AND DEVICE FOR LIGHT SIGNAL RECEPTION

(75) Inventors: Ing-Song Lin, Taichung (TW);
Jui-Feng Huang, Taichung (TW);
Lung-Pin Chung, Taichung (TW);
Ai-Ling Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 161 days.

(21) Appl. No.: 10/790,899

(22) Filed: Mar. 1, 2004

(65) Prior Publication Data
US 2005/0002015 A1 Jan. 6, 2005

(30) Foreign Application Priority Data
Jul. 1, 2003 (TW) ............................. 92117922 A (51) Int. Cl.
*G01C 3/08* (2006.01)
(52) U.S. Cl. ................. 356/4.01; 356/4.01; 356/4.02; 356/4.03; 356/5.01
(58) Field of Classification Search ............... 356/4.01
See application file for complete search history.

(56) References Cited

U.S. PATENT DOCUMENTS 5,926,260 A * 7/1999 Dunne et al. .............. 356/5.05
6,313,464 B1 * 11/2001 Schrader ..................... 250/349

* cited by examiner

Primary Examiner—Thomas H. Tarcza
Assistant Examiner—Luke D. Ratcliffe
(74) Attorney, Agent, or Firm—Thomas, Kayden, Horstemeyer & Risley (57) ABSTRACT

Method and device for light signal reception. This device can selectively execute a comparison mode or a gain mode. In the device, a transmitter transmits a light beam to a target. A receiver receives the light beam reflected from the target and outputs a corresponding received signal. In the comparison mode, it is determined whether a pulse in the received signal is higher than a reference voltage level. When the pulse is higher the reference voltage level, the pulse is outputted. The gain mode is executed and the received signal is amplified and output when no pulse is higher than the reference voltage level in the received signal. The method and device of the present invention can be applied to range finders, the comparison mode is executed during short-distance measurement and the gain mode is executed during long-distance measurement thereby measuring the target distance from several meters to a thousand meters.

8 Claims, 8 Drawing Sheets

METHOD AND DEVICE FOR LIGHT SIGNAL RECEPTION

BACKGROUND OF THE INVENTION

1. Field of the Invention

The present invention relates to light signal receiving method, and more particularly, the invention relates to a light signal receiving method and device thereof applicably to range finders, and capable of both long-distance measurement and short-distance measurement.

2. Description of the Related Art

In conventional pulse laser range finders, current noise is produced during measurement. After conversion into time domain, the location of the current noise is at location distance 7~10 meters from the ranger finders meaning noise and true signals cannot be differentiated between when the distance from the target to the range finder is within 10 meters. To address this problem, small signal noise can be eliminated using a high reference voltage level provided by a single comparator. However, this method also eliminates the small signal pulse needed for long distance measurement, hence a long distance target cannot be measured.

SUMMARY OF THE INVENTION

It is therefore an object of the present invention to provide method and device for light signal reception applicable to range finders, capable of both long-distance measurement and short-distance measurement.

According to the above mentioned object, the present invention provides a method for light signal reception. First, a first light beam is transmitted to a target. The light beam reflected from the target is then received and a corresponding first received signal is output by a receiver. It is then determined whether a pulse in the first received signal is higher than a reference voltage level. When the pulse is higher than the reference voltage level, the pulse is output. A second light beam is transmitted to the target, and a second received signal is output according to the light beam reflected from the target again, when no pulse in the first received signal is higher than the reference voltage level. Finally, the second received signal is amplified non-linearly and output.

According to the above mentioned object, the present invention also provides another method for light signal reception. In this method, a comparison/gain device is applied to execute a comparison mode and a gain mode. First, the comparison/gain device executes the comparison mode, and a light beam is transmitted to a target by a transmitter. The light beam reflected from the target is then received and a first received signal is output by a receiver. In the comparison mode, the comparison/gain device compares pulses in the first received signal with a reference voltage level, and outputs the pulse higher than the reference voltage level. In this method, the gain mode is executed when all pulses in the first received signal are smaller than the reference voltage level. In the gain mode, the transmitter transmits another light beam to the target again, and the light beam reflected from the target is received and a second received signal is output by the receiver. Finally, the comparison/gain device amplifies and outputs the second received signal non-linearly.

According to the above mentioned object, the present invention also provides another method for light signal reception. In this method, a channel selection circuit is applied to select a comparison circuit or a gain circuit. First, the channel selection circuit selects the comparison circuit, and a light beam is transmitted to a target by a transmitter. The light beam reflected from the target is then received and a first received signal is outputted by a receiver. The comparison circuit compares pulses in the received signal with a reference voltage level, and outputs the pulse higher than the reference voltage level. In this method, the gain mode is executed when all pulses in the received signal are smaller than the reference voltage level. Consequently, the transmitter again transmits a light beam to the target, and the light beam reflected from the target is received and a second received signal is output by the receiver. Finally, the comparison/gain device amplifies and outputs the second received signal non-linearly.

The feature of the present invention resides in that the comparison mode is applied to measure the short distance target, and the gain mode is applied to measure the long distance target. The operation mode of the comparison/gain device is switched by a mode switching circuit.

Another feature of the present invention resides in that the comparison circuit is applied to measure the short distance target, and the gain circuit is applied to measure the long distance target. In this case, the comparison circuit and the gain circuit are electrically connected to a processor selectively by a channel selection circuit. Therefore, the light signal receiving method of the present invention enables measurement of the target distance from several meters to thousand meters.

BRIEF DESCRIPTION OF THE DRAWINGS

The present invention can be more fully understood by the subsequent detailed description and examples with reference made to the accompanying drawings, wherein:

FIG. 5 is a circuit diagram of the channel selection circuit shown in FIG. 3a;

DETAILED DESCRIPTION OF THE INVENTION

The method and device for light signal reception of the present invention applicable to range finders is described in the following.

Figure 1:
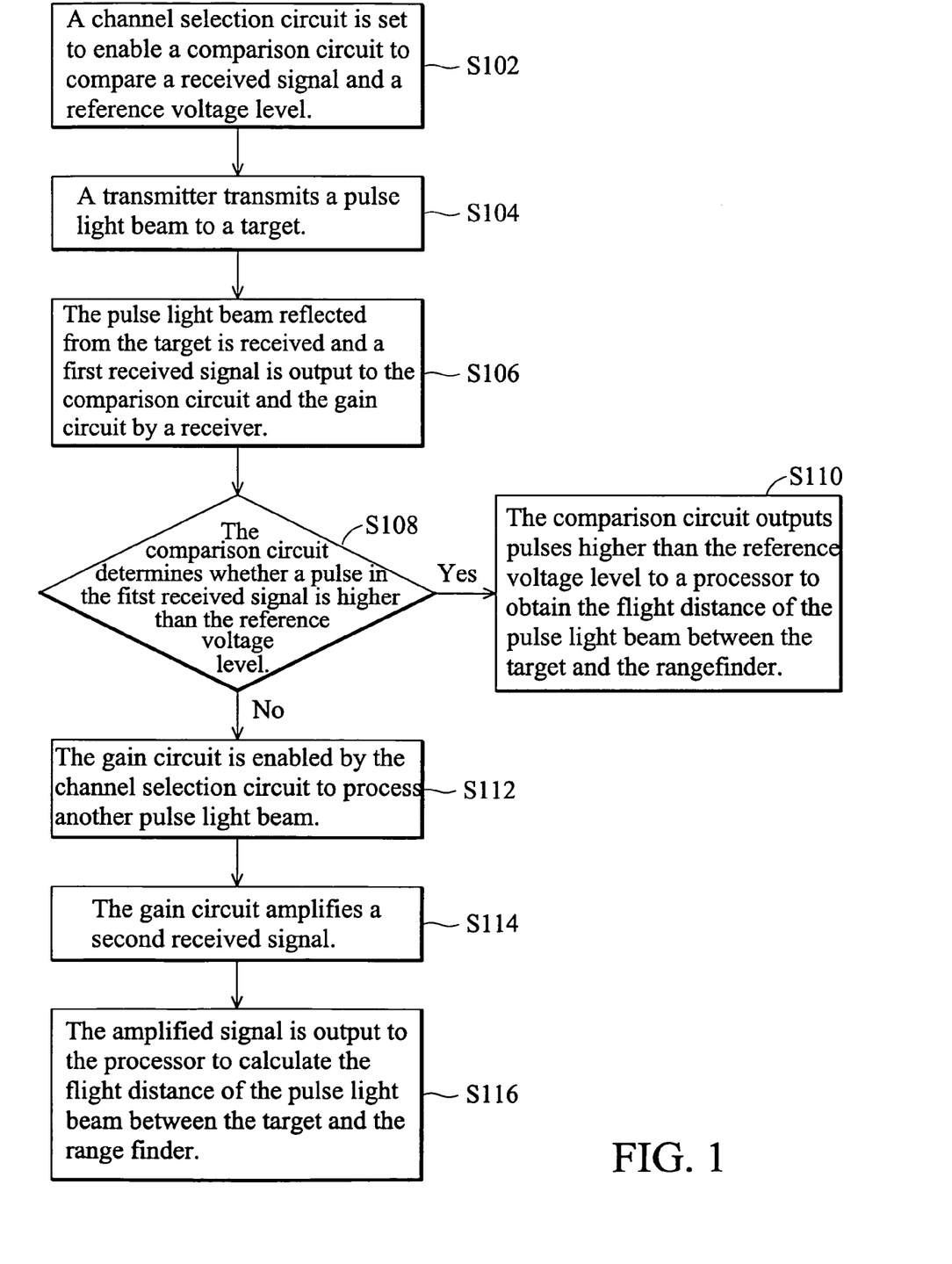
FIG. 1 is a flowchart of the light signal reception method according to the present invention.

FIG. 1 is a flowchart of the method for light signal reception according to the present invention. First, a channel selection circuit is set to enable a comparison circuit to compare a received signal and a reference voltage level in step S102. The reference voltage level is slightly higher than the spike noise voltage. The spike noise is produced simultaneously when the pulse signal transmitted by a transmitter.

Consequently, the spike noise is eliminated by the comparison circuit. Next, in step S104, the transmitter transmits a pulse light beam to a target, and the target reflects the pulse light beam. The pulse light beam reflected from the target is received and a first received signal is output to the comparison circuit and the gain circuit by a receiver in step S106. In step S108, the comparison circuit then determines whether a pulse is higher than the reference voltage level, in the first received signal. Next, in step S110, the comparison circuit outputs pulses higher than the reference voltage level to a processor when the received signal includes pulses higher than the reference voltage level. Consequently, the flight distance of the pulse light beam between the target and the range finder can be calculated by processing the pulse higher than the reference voltage level with a processor. In step S112, the gain circuit is enabled by the channel selection circuit to process another pulse light beam when no pulse is higher than the reference voltage level in the first received signal. Next, in step S114, the gain circuit amplifies a second received signal. Finally, in step S116, the second received signal is amplified and output to the processor for calculation of the flight distance of the pulse light beam between the target and the range finder.

Figure 2:
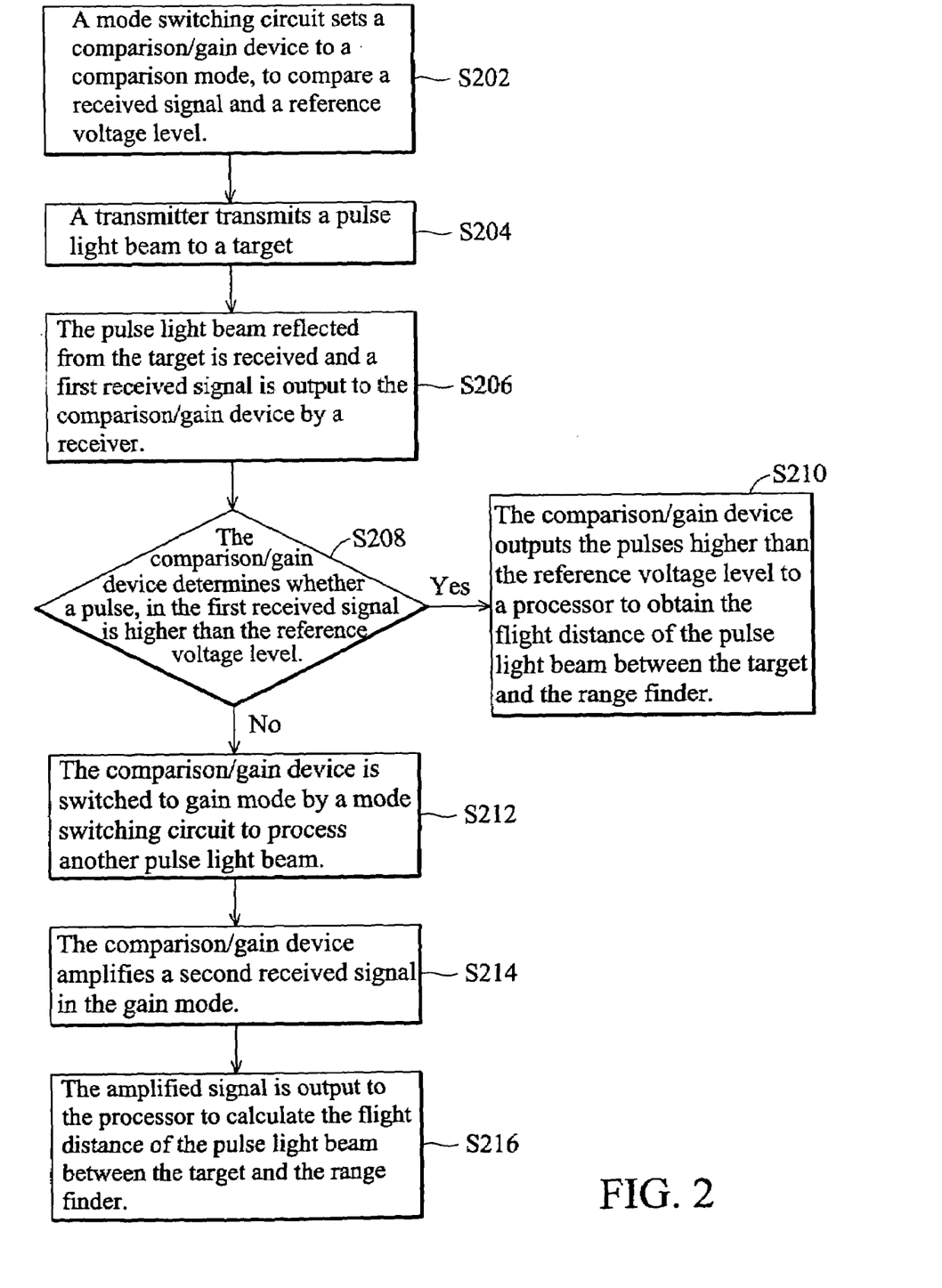
FIG. 2 is another flowchart of the light signal reception method according to the present invention.

FIG. 2 is flowchart of another method for light signal reception according to the present invention. First, in step S202, a mode switching circuit sets a comparison/gain device to a comparison mode to compare a received signal and a reference voltage level. Next, in step S204, the transmitter transmits a pulse light beam to a target, and the target reflects the pulse light beam. The pulse light beam reflected from the target is received and a first received signal is output to the comparison/gain device by a receiver in step S206. In step S208, the comparison/gain device then determines whether the pulse in the first received signal is higher than the reference voltage level. Next, in step S210, the comparison/gain device outputs the pulse higher than the reference voltage level to a processor when the first received signal includes pulses higher than the reference voltage level. Consequently, the flight distance of the pulse light beam between the target and the range finder can be calculated by processing the pulse higher than the reference voltage level with a processor. In step S212, the comparison/gain device is switched to gain mode to process another pulse light beam when no pulse in the first received signal is higher than the reference voltage level. Next, in step S214, the comparison/gain device amplifies a second received signal in gain mode. Finally, in step S216, the second received signal is amplified and output to the processor to calculate the flight distance of the pulse light beam between the target and the range finder.

Figure 3A:
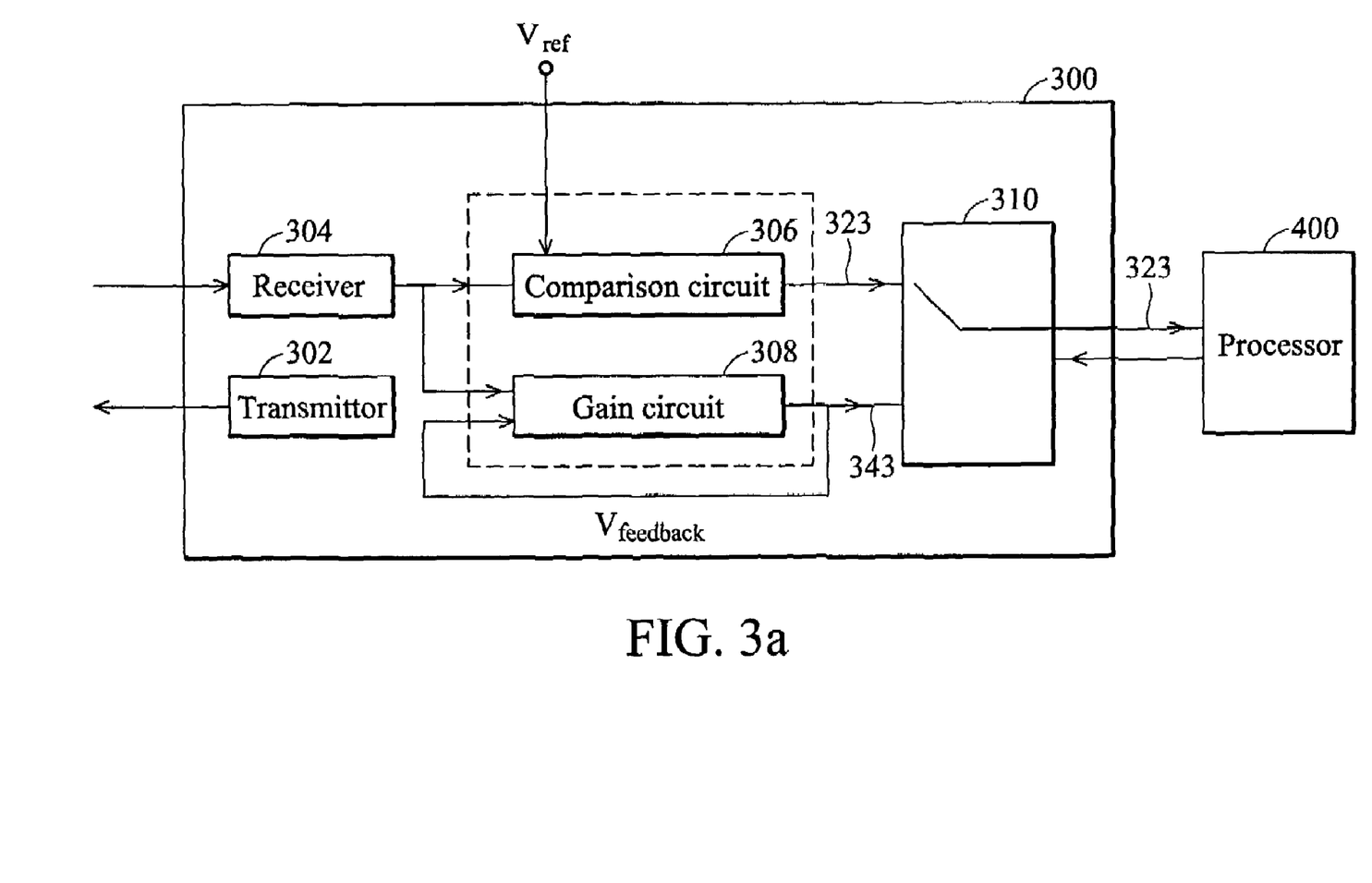
FIG. 3a is a block diagram of light signal reception device according to the flowchart shown in FIG. 1.

FIG. 3a is a block diagram of light signal reception device according to the flowchart shown in FIG. 1. As shown in FIG. 3a, the light signal receiving device 300 includes a transmitter 302, a receiver 304, a comparison circuit 306, a gain circuit 308 and a channel selection circuit 310. The transmitter 302 transmits pulse light beams to a target, and the target reflects the pulse light beams. The receiver 304 receives the pulse light beams reflected from the target, and outputs corresponding received signals to the comparison circuit 306 and the gain circuit 308.

Figure 4A:
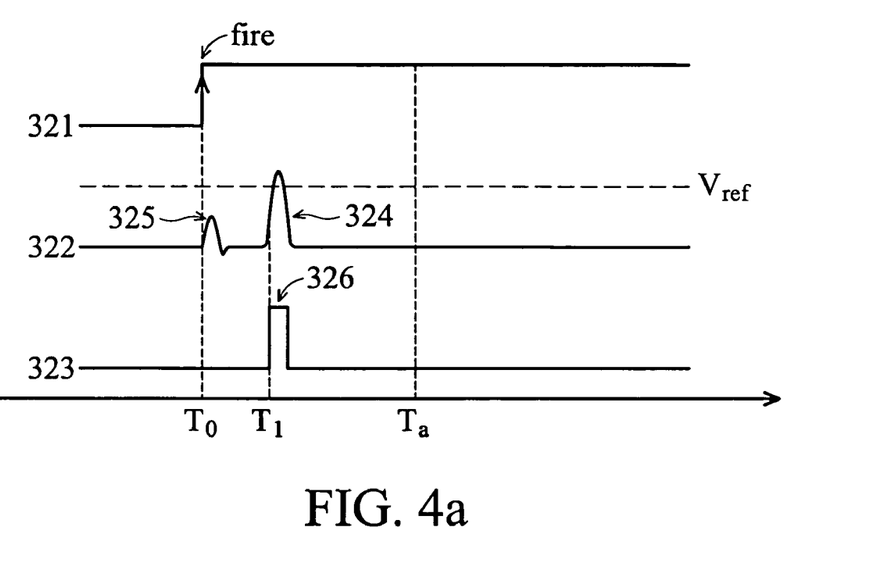
FIG. 4a is a timing chart output from the comparison circuit.

The comparison circuit 306 has a reference voltage level $V_{ref}$. The reference voltage level is slightly higher than spike noise voltage level. The spike noise is produced simultaneously when pulse signal is transmitted from the transmitter 302. Consequently, the spike noise is eliminated by the comparison circuit 306. FIG. 4a is a timing chart output from the comparison circuit 306. As shown in FIG. 4a, the signal 321 is a pulse signal transmitted to the target from the transmitter 302 at time $T_0$. The received signal 322 has a spike noise 325 after time $T_0$. The comparison circuit 306 receives the received signal 322 and outputs the signal 323. Namely, the signal 323 is the output wave of the comparison circuit 306 after receiving the received signal 322. In the comparison circuit 306, pulses smaller than the reference voltage level $V_{ref}$ can be eliminated when the distance between the target and the range finder is within 30 meters. Consequently, the signal 323 only includes pulse 326 without spike noise 325. The pulse light beam reflected from the target can maintain considerable energy intensity if the distance between the target and the range finder is within 30 meters exactly. Thus, the received signal 322 output from the receiver 304 may has a target pulse 324 higher than the reference voltage level $V_{ref}$.

Initially, the channel selection circuit 310 connects to the comparison circuit 306 such that the signal 323 output from comparison circuit 306 can be transferred to a processor 400. Consequently, the processor 400 determines whether a reflected pulse light beam from the target is received by the receiver 304 during time $T_a$, and calculates the distance between the target and the range finder. The processor 400 enables the channel selection circuit 310 to connect to the gain circuit 308 when the channel selection circuit 310 has no output or the processor 400 cannot obtain the distance between the target and the range finder.

Figure 4B:
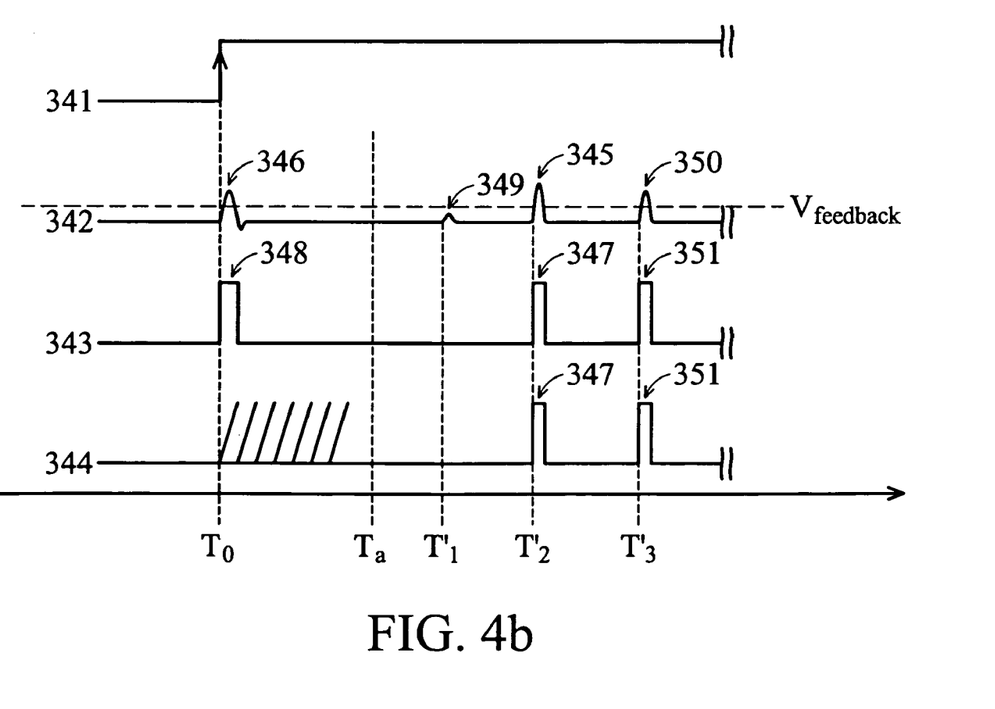
FIG. 4b is a timing chart output from the gain circuit.

The gain circuit 308 has a feedback voltage level $V_{feedback}$, wherein the feedback voltage level $V_{feedback}$ is provided from the output of the gain circuit 308, and the feedback voltage level $V_{feedback}$ is smaller than the reference voltage level $V_{ref}$. The gain circuit 308 amplifies pulses therethrough non-linearly. FIG. 4b is a timing chart output from the gain circuit 308. The flight time of pulse light beam between the target and the range finder would exceed time $T_a$ when the distance between the target and the range finder exceeds 30 meters. As shown in FIG. 4b, the signal 341 is a pulse signal transmitted to the target from the transmitter 302 at time T0. The received signal 342 has spike noise 346 in the proximity of time $T_0$, and the pulses 349, 345 and 350 occur in the received signal sequentially at time $T'_1$, $T'_2$ and $T'_3$. The pulse 349 is eliminated by the gain circuit 308 because the peak voltage of the pulse 349 is smaller than the feedback voltage level $V_{feedback}$ when the received signal 342 goes through the gain circuit 308. The pulses 345 and 350 and spike noise 346 are amplified non-linearly by the gain circuit 308. The gain circuit 308 receives the received signal 342 and outputs the signal 343. Namely, the signal 343 is the output wave of the gain circuit 308 after receiving the received signal 342. The square waves 348, 347 and 351 are amplification of the spike noise 346 and the pulses 345 and 350, wherein the square waves 348, 347 and 351 have the same peak voltage level. The signal 343 output from gain circuit 308 can be transferred to the processor 400 to calculate the distance between the target and the range finder. In the present invention, the processor 400 accumulates the amplified signal 343 corresponding to the pulse light beams by statistical operation so as to distinguish between the pulse light beam reflected from the target and environment light. During the statistical operation, the processor 400 eliminates the square wave produced before time Ta automatically, such as square wave 348, and calculates the signal 344.

Figure 5:
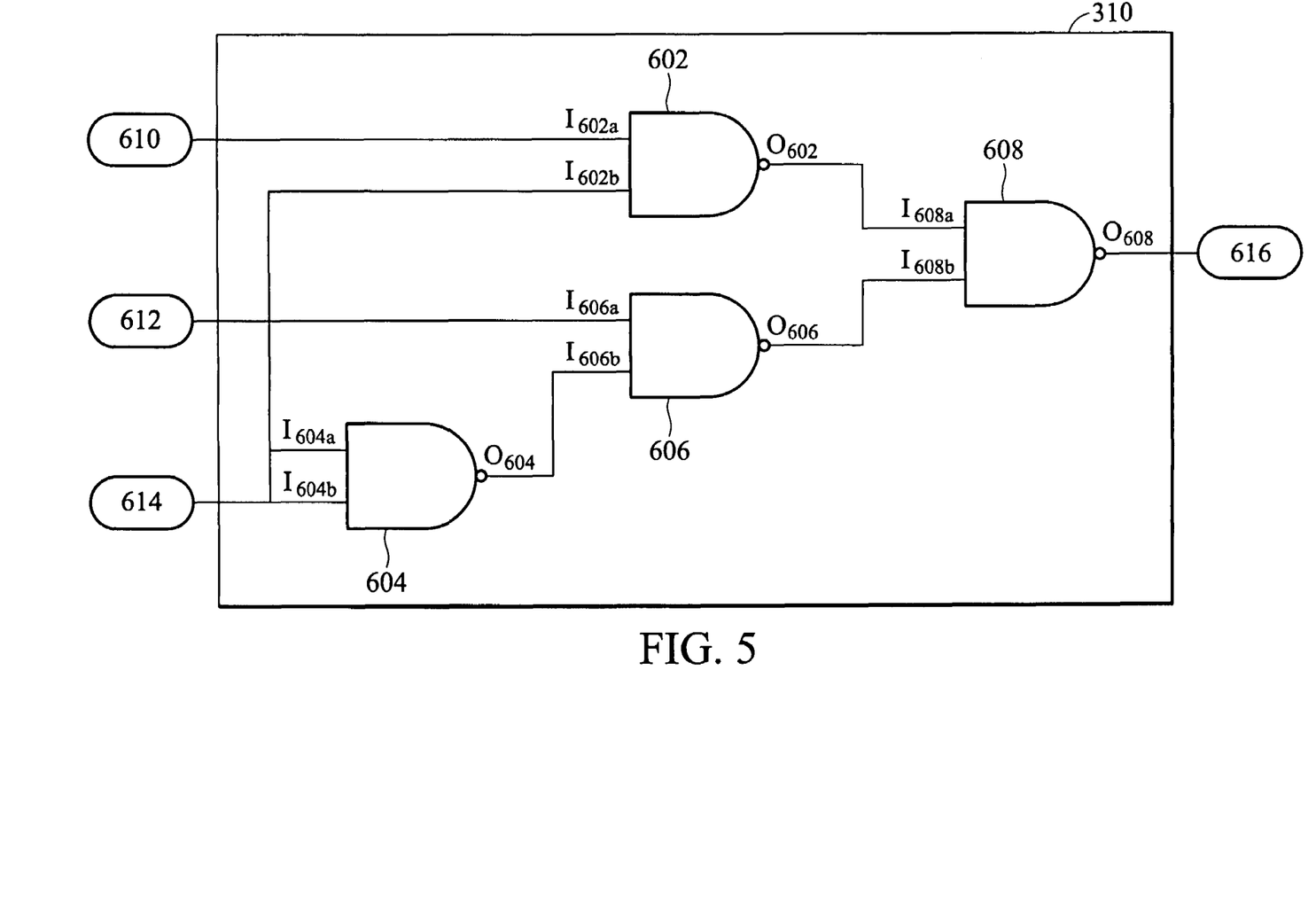

FIG. 5 is a circuit diagram of the channel selection circuit shown in FIG. 3a. As shown in FIG. 3a, the channel selection circuit includes NAND gates 602, 604, 606 and 608. The NAND gate 602 has two input terminals I602a and I602b, and an output terminal O602, wherein the input terminal I602a is coupled to a first channel input terminal 610, and the input terminal I602b is coupled to the channel selection signal input terminal 614. The NAND gate 604 has two input terminals I604a and I604b coupled to the channel selection signal input terminal 614, and an output terminal O604. The NAND gate 606 has two input terminals I606a and I606b, and an output terminal O606, wherein the input terminal I606a is coupled to a second channel input terminal 612, and the input terminal I606b is coupled to the output terminal O604 of the NAND gate 604.

The NAND gate 608 has two input terminals I608a and I608b, and an output terminal O608, wherein the input terminal I608a is coupled to the output terminal O602 of the NAND gate 602, the input terminal I606b is coupled to the output terminal O604 of the NAND gate 606, and the output terminal O608 serves as the output terminal 616 of the channel selection circuit.

The first channel input terminal 610 is coupled to the gain circuit 308 and the second channel input terminal 612 is coupled to the comparison circuit 306 as shown in FIG. 3a. The channel selection circuit 310 connects the first channel input terminal 610 to the gain circuit 308 or connects the second input terminal 612 to the comparison circuit 306 according to the channel selection signal at the channel selection input terminal 614. The output terminal 616 of channel selection circuit 310 is coupled to a processor 400 to estimate distance between the target and the range finder by the output signal through the output terminal 608.

Figure 3B:
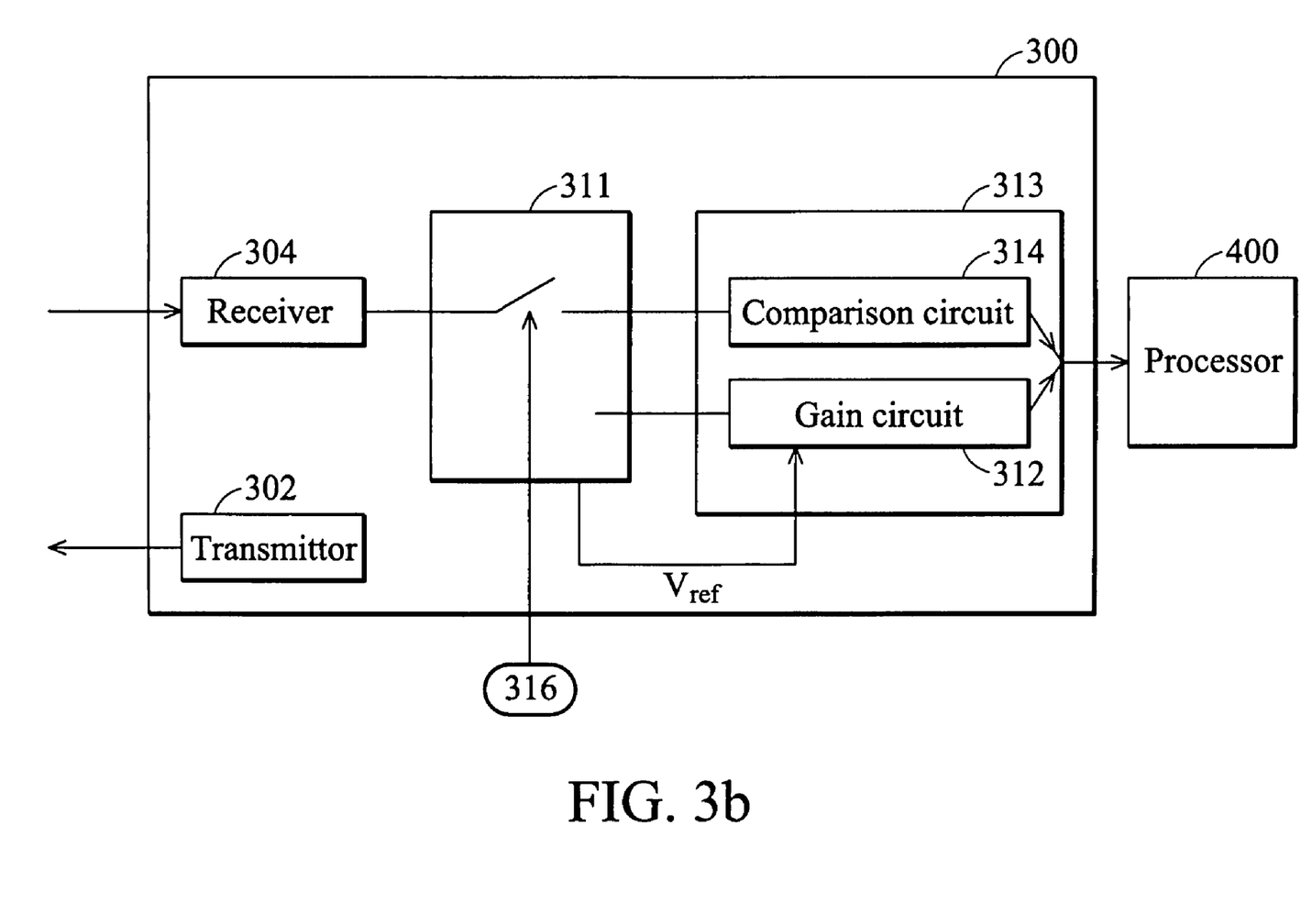
FIG. 3b is another block diagram of light signal receiving device according to the flowchart shown in FIG. 2.

FIG. 3b is another block diagram of light signal receiving device according to the flowchart shown in FIG. 2. As shown in FIG. 3b, the light signal receiving device 300 includes a transmitter 302, a receiver 304, a mode switching circuit 311 and a comparison/gain device 313. The transmitter 302 transmits pulse light beams to a target, and the target reflects the pulse light beams. The receiver 304 receives the pulse light beams reflected from the target, and outputs corresponding received signals to the comparison/gain device 313 through the mode switching circuit 311.

Initially, the range finder using the light receiving device assumes that the distance between the target and the device is within 30 meters. The mode switching circuit 311 sets the comparison/gain device to operate in a comparison mode, and provides a reference voltage $V_{ref}$ to the comparison/gain device 313. Thus, the received signal output from the receiver 304 is transferred to the comparison/gain device 313 operating in the comparison mode through the mode switching circuit 311. The mode switching circuit 311 enables comparison/gain device 313 to operate in a gain mode and to process the received signal output from the receiver 304 when the distance between the range finder and the target cannot be measured in the comparison mode. During operation in comparison mode, the mode switching circuit 311 provides a reference $V_{ref}$ to the comparison/gain device 313.

Figure 6A:
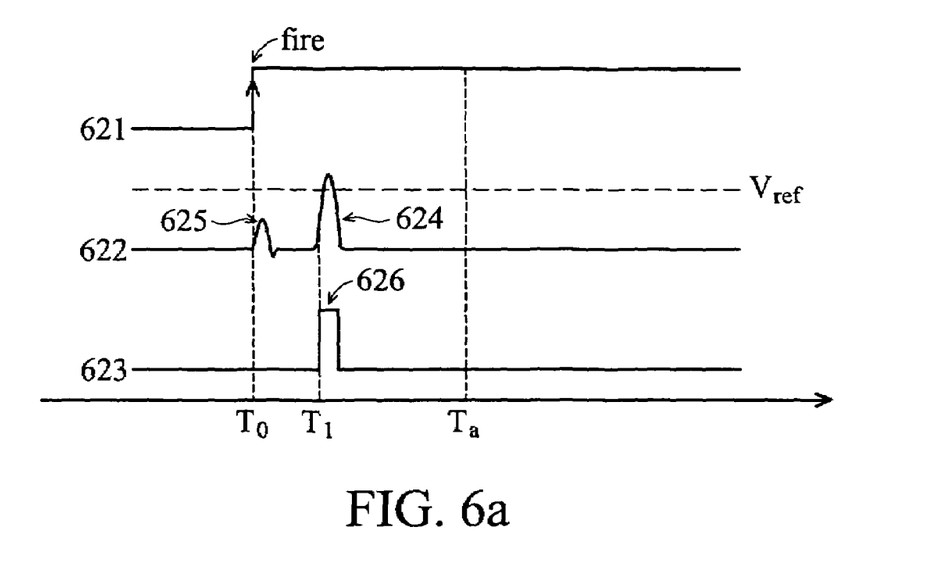
FIG. 6a is a timing chart output from the comparison/gain device.

The channel selection circuit 310 connects to the comparison circuit 306 such that the signal 323 output from comparison circuit 306 can be transferred to a processor 400. Consequently, the processor 400 determines whether a reflected pulse light beam from the target is received by the receiver 304 during time $T_a$, and calculates the distance between the target and the range finder. The processor 400 enables the channel selection circuit 310 to connect to the gain circuit 308 when the channel selection circuit 310 has no output or the processor 400 cannot obtain the distance between the target and the range finder. The reference voltage level $V_{ref}$ is slightly higher than spike noise. The spike noise is produced when pulse signal transmitted from the transmitter 302. Consequently, the spike noise can be eliminated by the comparison/gain device 313. FIG. 6a is a timing chart output from the comparison/gain device.

As shown in FIG. 6a, the signal 621 is a pulse signal transmitted to the target from the transmitter 302 at time T0. The received signal 622 has a spike noise 325 after time T0. The comparison/gain device 313 receives the received signal 622 and outputs the signal 623. Namely, the signal 623 is the output wave of the comparison/gain device 313 after receiving the received signal 622. In the comparison mode 312, the pulses smaller than the reference voltage level $V_{ref}$ can be eliminated by the comparison/gain device 313 when the distance between the target and the range finder is within 30 meters. Consequently, the signal 623 only includes pulse 624 without spike noise 625. The pulse light beam reflected from the target can maintain considerable energy intensity if the distance between the target and the range finder is within 30 meters exactly. Thus, the received signal 622 output from the receiver 304 may have a target pulse 624 higher than the reference voltage level $V_{ref}$.

Initially, the mode switching circuit 311 enables the comparison/gain device 313 to operate in a comparison mode 312 and to output the signal 623 to a processor 400. Consequently, the processor 400 determines whether a reflected pulse light beam from the target is received by the receiver 304 during time $T_a$, and calculates the distance between the target and the range finder. The processor 400 enables the comparison/gain device 313 to operate in a gain mode 314 when the comparison/gain device 313 has no output or the processor 400 cannot obtain the distance between the target and the range finder.

Figure 6B:
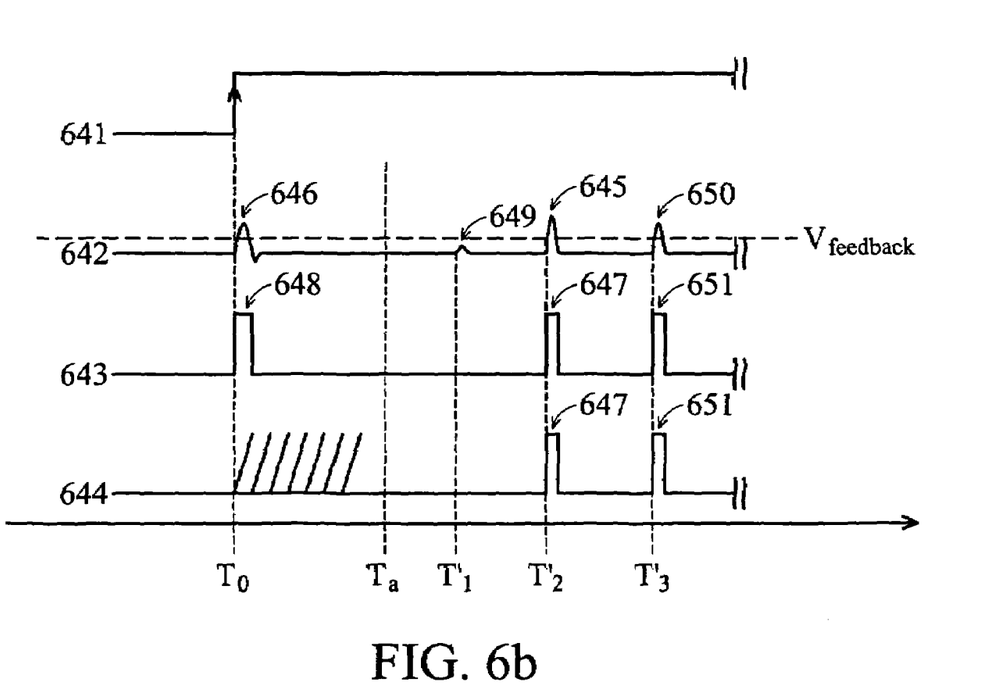
FIG. 6b is another timing chart output from the comparison/gain device.

In the gain mode 314, the comparison/gain device 313 has a feedback voltage level $V_{feedback}$, wherein the feedback voltage level $V_{feedback}$ is provided from the output of the comparison/gain device 313, and the feedback voltage level $V_{feedback}$ is smaller than the reference voltage level $V_{ref}$. The comparison/gain device 313 gains the pulses therethrough non-linearly in the gain mode 314. FIG. 6b is a timing chart output from the comparison/gain device 313. The flight time of pulse light beam between the target and the range finder will exceed time $T_a$ if the distance between the target and the range finder exceeds 30 meters. As shown in FIG. 6b, the signal 641 is a pulse signal transmitted to the target from the transmitter 302 at time $T_0$. The received signal 642 has a spike noise 646 in the proximity of time $T_0$, and the pulses 649, 645 and 650 occur in the received signal at time $T'_1$, $T'_2$ and $T'_3$ sequentially. The pulse 649 is eliminated by the comparison/gain device 313 because the peak voltage of the pulse 649 is smaller than the feedback voltage level $V_{feedback}$ when the received signal 642 goes through the comparison/gain device 313. The pulses 645 and 650 and the spike noise 646 are amplified non-linearly by the comparison/gain device 313. The comparison/gain device 313 receives the received signal 642 and outputs the signal 643. Namely, the signal 643 is the output wave of the comparison/gain device 313 after receiving the received signal 642. The square waves 648, 647 and 651 are amplification of the spike noise 646 and the pulses 645 and 650, wherein the square waves 648, 647 and 651 have the same peak voltage level. The signal 643 output from comparison/gain device 313 is transferred to the processor 400 for calculation of the distance between the target and the range finder. In the present invention, the processor 400 accumulates the amplified signal 643 corresponding to the pulse light beams by statistical operation so as to distinguish between the pulse light beam reflected from the target and environment light.

During the statistical operation, the processor 400 eliminates the square wave produced before time Ta automatically, such as square wave 648, and calculates the signal 644.

Figure 7:
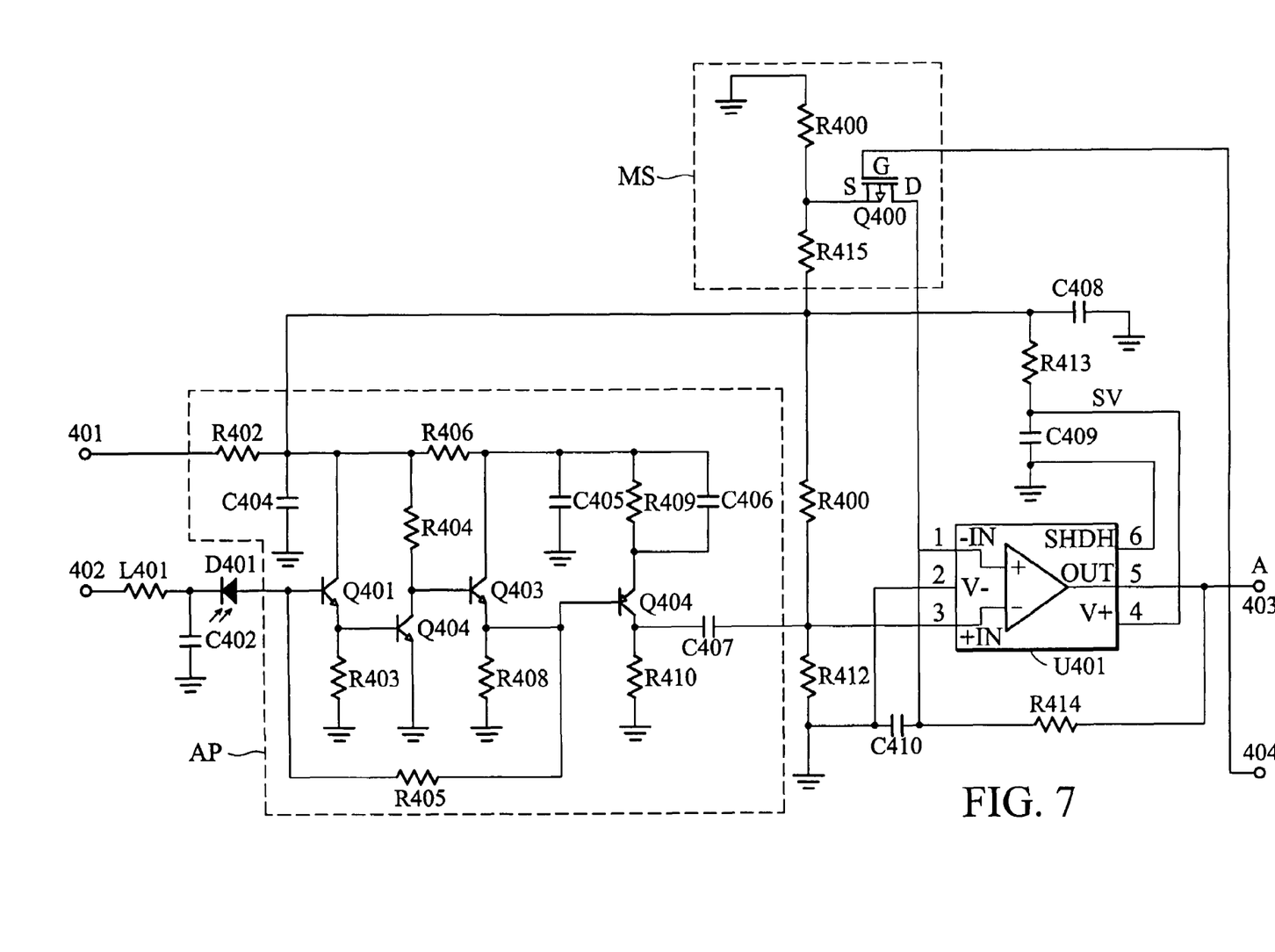
FIG. 7 is a circuit diagram of the light signal receiving device shown in FIG. 3b.

FIG. 7 is a circuit diagram of the light signal receiving device shown in FIG. 3b. As shown in FIG. 7, the light signal receiving device includes a photoelectric detector D401, amplification circuit AP, a mode switching circuit MS and a comparison/gain device U401. The photoelectric detector D401 receives the light beams reflected from the target, and outputs corresponding received signals to the amplification circuit AP. The amplification circuit AP amplifies and outputs the received signals to the comparison/gain device U401. The operating mode of the comparison/gain device U401 is switched by the mode switching circuit MS. The mode switching circuit MS provides a reference voltage $V_{ref}$ to the terminal 1 of the comparison/gain device U401 when the comparison/gain device U401 is switched to operate in comparison mode. Consequently, the comparison/gain device estimates the pulses smaller than the reference voltage level $V_{erf}$ in the received signal and outputs only the pulses higher than the reference voltage level $V_{erf}$ in the received signal. Typically, the mode switching circuit MS provides a reference voltage level $V_{ref}$ to the comparison/gain device U401 and enables the comparison/gain device U401 to operate in comparison mode. The mode switching circuit MS switches the comparison/gain device U401 to operate in a gain mode 314 when the comparison/gain device U401 has no output or the processor cannot obtain the distance between the target and the range finder by processing the peak voltage level from the comparison/gain device U401. At this time, the mode switching circuit MS stops to provide the reference voltage level to the terminal 1 of comparison/gain device U401. The terminal 1 receives a feedback voltage level $V_{feedback}$ from of the comparison/gain device U401 when the comparison/gain device U401 is switched to operate in gain mode. Consequently, the pulses smaller than the feedback voltage level in the received signal can be eliminated in the gain mode, and the remaining pulses in the received signal are amplified non-linearly by the comparison/gain device U401.

It should be noted that in the above embodiment the range finder is operated in short-distance mode when the target distance from the range finder is within 30 meters, it is to be understood that the invention is not limited to the disclosed embodiments. This distance, however, can be adjusted by the range finder, and different range finders can define different distances to operate in short-distance mode.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for light signal reception, comprising the steps of:

(A) transmitting a light beam to a target;

(B) receiving the light beam reflected from the target and outputting a first received signal, wherein the received signal has at least one pulse;

(C) eliminating pulses smaller than a reference voltage level in the first received signal and determining whether a pulse is higher than the reference voltage level in the first received signal without processing by a gain circuit;

(D) outputting the pulse to a processor to execute operational processes when the pulse in the first received signal is higher than the reference voltage level;

(E) repeating the steps (A) and (B) to obtain a second received signal when, in the first received signal, no pulse is higher than the reference voltage level; and (F) amplifying the second received signal and outputting to the processor to determine the distance between the target and a ranger finder according to the pulse or the amplified second received signal.

2. The method as claimed in claim 1, wherein the pulses smaller than the reference voltage level are eliminated by a comparison circuit in step (C).

3. The method as claimed in claim 2, wherein the second received signal is amplified by a gain circuit in step (F).

4. The method as claimed in claim 3, wherein the gain circuit amplifies the second received signal non-linearly.

5. The method as claimed in claim 3, wherein the gain circuit has a feedback voltage level which is feedback from an output terminal of the gain circuit to an input terminal of the gain circuit.

6. The method as claimed in claim 3, further comprising a step of connecting a channel selection circuit to the comparison circuit or the gain circuit selectively.

7. A device, comprising:

a transmitter transmitting a light beam to a target;

a receiver receiving the light beam reflected from the target and outputting a corresponding received signal;

a comparison circuit having a reference voltage level, and receiving the received signal to determine whether a pulse is higher than the reference voltage level, in the received signal;

a gain circuit receiving the received signal from the receiver to amplify and output a corresponding amplified signal;

a processor receiving and processing the pulse or the amplified signal to determine the distance between the target and a ranger finder, and a channel selection circuit selectively outputting one of the pulse from the comparison circuit and the amplified signal from the gain circuit to the processor according to a channel selection signal.

8. The device as claimed in claim 7, wherein the gain circuit has a feedback voltage level which is feedback from an output terminal of the gain circuit to an input terminal of the gain circuit.

* * * * *